US006186332B1

(12) United States Patent
Combs (10) Patent No.: US 6,186,332 B1
(45) Date of Patent: Feb. 13, 2001

(54) COMPACT DISC AND BOOKLET DISPLAY STAND

(75) Inventor: Jeff Combs, Greenwood, IN (US)

(73) Assignee: Discom Technologies, LLC, Greenwood, IN (US)

(*) Notice: Under 35 U.S.C. 154(b), the term of this patent shall be extended for 0 days.

(21) Appl. No.: 09/410,246

(22) Filed: Sep. 30, 1999

Related U.S. Application Data (60) Provisional application No. 60/102,502, filed on Sep. 30, 1998, and provisional application No. 60/104,334, filed on Oct. 15, 1998.

(51) Int. Cl.⁷ .................................................. B65D 85/57
(52) U.S. Cl. ...................... 206/759; 206/45.25; 206/232; 206/308.1; 383/39
(58) Field of Search .................... 206/232, 308.1, 206/308.3, 425, 45.25, 759; 211/40, 41.12; 281/1, 3.1, 15.1, 19.1, 19.2, 22; 248/130, 133–136, 459, 460, 465.1; 383/39

(56) References Cited

U.S. PATENT DOCUMENTS

| | | | | |
|---|---|---|---|---|
| 4,577,889 | * | 3/1986 | Schulz | 281/1 |
| 5,193,681 | * | 3/1993 | Lievsay | 206/425 |
| 5,412,886 | * | 5/1995 | Quinn | 40/124.2 |
| 5,419,018 | * | 5/1995 | Karlis et al. | 206/473 |
| 5,419,437 | * | 5/1995 | Huseman | 206/554 |
| 5,588,528 | * | 12/1996 | Ozeki | 206/308.1 |
| 5,762,246 | * | 6/1998 | Drew | 206/308.1 |

* cited by examiner

Primary Examiner—Jim Foster
(74) Attorney, Agent, or Firm—Woodard, Emhardt, Naughton, Moriarty & McNett (57) ABSTRACT

The present invention relates to a compact disc (CD) and booklet display stand that enables a plurality of such CDs and booklets to be stored for convenient access, such as in a desktop environment. The display stand mounts a plurality of CD/booklet holders to a stand that places the holders for convenient access by a user. Some embodiments of the display stand may be folded for secure transportation or storage.

18 Claims, 6 Drawing Sheets

COMPACT DISC AND BOOKLET DISPLAY STAND

CROSS-REFERENCE TO RELATED APPLICATIONS

The present application claims priority under 35 U.S.C. § 120 from the following U.S. Provisional patent applications:

Provisional patent application Serial No. 60/102,502, filed Sep. 30, 1998

Provisional patent application Serial No. 60/104,334, filed Oct. 15, 1998.

TECHNICAL FIELD OF THE INVENTION

The present invention generally relates to compact disc holders and, more particularly, to a compact disc and booklet display stand.

BACKGROUND OF THE INVENTION

Compact discs (CDs) are popular mediums for the storage of music, computer software, computer games, etc. As used herein, the term "compact disc" is intended to encompass any compact digital storage disc, such as compact discs for the storage of digitized music, CD-ROMs for the storage of digitized data and computer software, DVDs for the storage of digitized audio and video data, and other similar disc formats, whether now known or developed in the future. Such CDs are usually packaged in a rigid plastic "jewel case" with a square, multi-page booklet containing information about the data stored on the CD. Because the jewel cases take up much more space than the CDs and booklets which they store, they are often considered a nuisance by users who need to have ready access to more than two or three CDs. The jewel cases are especially cumbersome when it is desired to store several CDs on a desktop to be used with a personal computer.

Prior art systems are known for collecting the CDs individually into a booklet having vinyl sleeves bound, for example, in a three-ring binder. It has been found that this solution is also unwieldy for use in a desktop setting. Consequently, there is a need for an improved CD holder which allows the CDs and their accompanying booklets to be stored for ready usage in a desk-top environment. The present invention is directed toward meeting this need.

SUMMARY OF THE INVENTION

The present invention relates to a compact disc (CD) and booklet display stand that enables a plurality of such CDs and booklets to be stored for convenient access, such as in a desktop environment. The display stand mounts a plurality of CD/booklet holders to a stand that places the holders for convenient access by a user. Some embodiments of the display stand may be folded for secure transportation or storage.

In one form of the present invention, a compact disc and booklet display stand is disclosed, comprising a plurality of holders, each holder adapted to hold a compact disc and a documentation booklet; a display stand having a bottom surface and at least on one side surface; and a binding for coupling said plurality of holders to said display stand at least one side surface; wherein said display stand orients said plurality of holders in a substantially vertical orientation when said display stand bottom surface is positioned on a horizontal surface.

In another form of the present invention, a compact disc and booklet holder is disclosed, comprising a backside piece; a compact disc pocket piece overlying said backside piece; and a booklet pocket piece overlying said compact disc pocket piece; wherein said backside piece, said compact disc pocket piece and said booklet pocket piece are coupled on three sides, thereby forming a compact disc pocket between said backside piece and said compact disc pocket piece, and forming a booklet pocket between said compact disc pocket piece and said booklet pocket piece.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
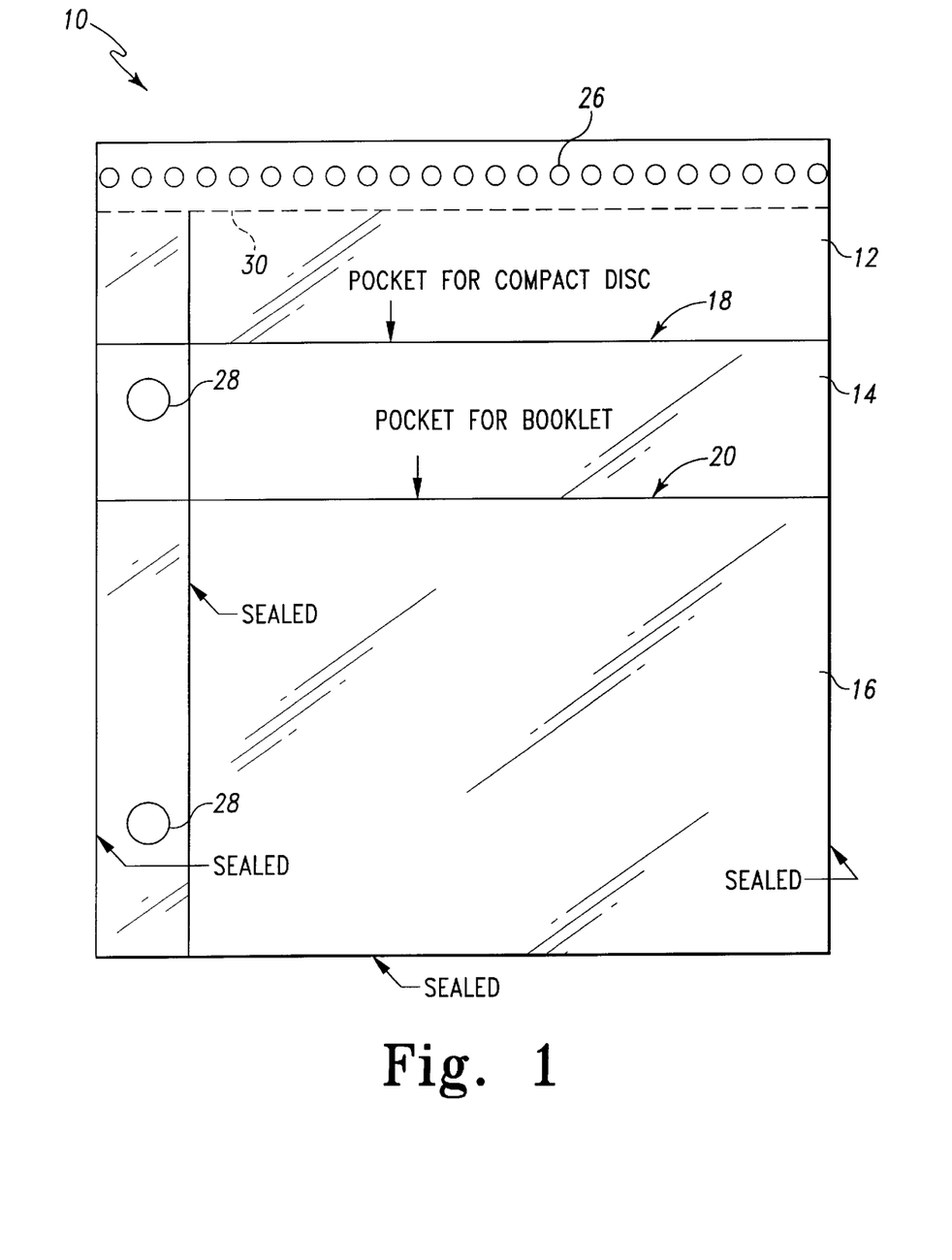
FIG. 1 is a plan view of a preferred embodiment single CD and booklet holder of the present invention.

FIG. 1 illustrates a single CD and booklet holder constructed according to a preferred embodiment of the present invention, and indicated generally at 10. The holder 10 comprises a backside piece 12 preferably formed from a piece of 14 gauge suede vinyl, preferably having the dimensions of 5⅝" by 5½". Overlying the backside 12 is a CD pocket piece 14 preferably formed from a piece of 8 gauge clear vinyl and preferably formed in the dimensions of 4½" by 5⅝". Finally, a booklet pocket piece 16 overlays the CD pocket piece 14 and is preferably formed with dimension 3¼" by 5⅝". The booklet pocket piece 16 is also preferably formed from 8 gauge clear vinyl. The dimensions given above are preferred for storage of standard CDs and their associated booklets, but are in no way intended to be limitations of the present invention. The present invention comprehends the use of any dimensions for the pieces 12–16 in order to provide a desired amount of storage therein.

The pieces 12–16 are then heat sealed to one another along the lines indicated in FIG. 1 using conventional heat sealing dies in order to form two storage pockets on top of the backside piece 12. The first pocket 18 may conveniently hold a CD which has been removed from its jewel case, while the pocket 20 may conveniently hold the associated information booklet removed from the jewel case. The holder 10 therefore provides a much lower-volume storage option for holding the CD and its associated booklet than is available in the prior art.

Figure 2:
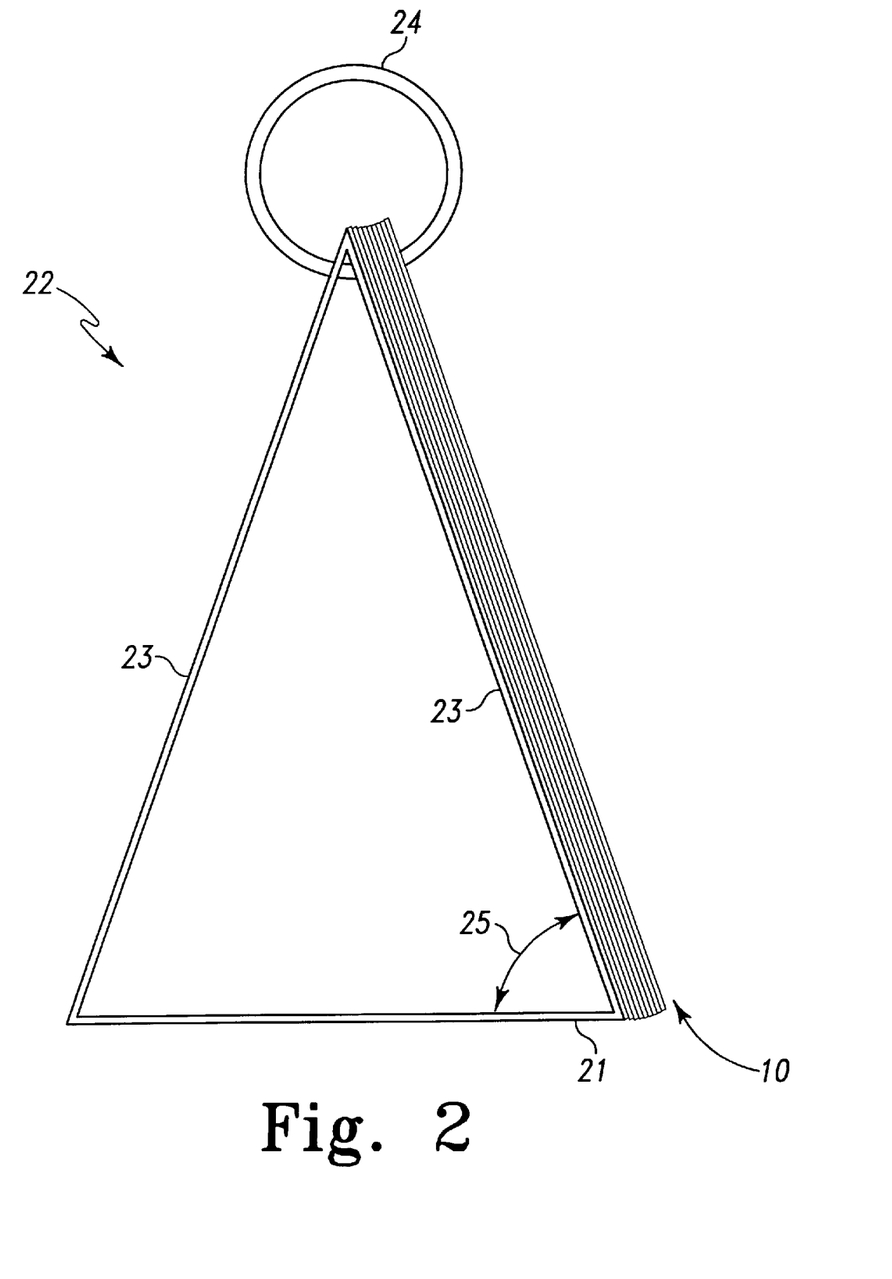
FIG. 2 is a side elevational view of a plurality of the holders of FIG. 1 bound into a first embodiment desktop display stand.

As shown in FIG. 2, a plurality of the holders 10 may be bound together along their top edge and attached to a stand-up display stand 22. Preferably, the holders 10 are coupled to one another and to the display stand 22 by means of a spiral binding 24. The spiral binding 24 is made from a piece of wire that is wound into a spiral and extends through holes 26 (see FIG. 1) formed through the holders 10 and the display stand 22 for this purpose. In a preferred embodiment, the display stand 22 has a bottom section 21 having a bottom surface dimension of 3" by 5⅝" and top sections 23 having top surface dimensions of 5½" by 5⅝". The display stand 22 is preferably formed from cardboard or other stiff material and forms a triangular cross-section, as shown in FIG. 2. More preferably, such cardboard is padded and then covered with vinyl.

The use of the spiral binding 24 to attach the holders 10 to the display stand 22 allows individual holders 10 to be rotated around the spiral binding 24 and placed on the back side of the display stand 22. In this way, the user may flip through the holders 10 until the desired holder 10 has been located, moving all of the holders 10 that are on top of the desired holder 10 to the rear of the display stand 22. This places the desired holder 10 on the front of the display stand, in the CD and the information booklet are then within easy reach.

As can be seen in FIG. 2, the display stand 22 orients the holders 10 in a substantially vertical orientation when the bottom surface is positioned on a horizontal surface. As used herein, the term "substantially vertical orientation" means oriented more than 45° from the horizontal surface when measuring the angle 25.

Those having ordinary skill in the art will recognize that other means may be used to attach the holders 10 to the display stand 22. For example, other binding techniques such as saddle stitching, perfect binding, two- or three-ring binding, rivets, nuts and bolts, etc. may be used.

Referring once again to FIG. 1, each of the holders 10 further includes a pair of holes 28 formed therethrough, preferably having a diameter of 5/16". The holes 28 allow the holder 10 to be mounted in a three-ring (or other similar) binder. In order to remove the holder 10 preferably from the display stand 22 in order to mount it in such a three-ring binder, the holder 10 preferably further includes a tear line 30 formed near its top surface. The tear line 30 may comprise a mechanical perforation formed into the backside piece 12, a heat seal line pressed into the backside piece 12 in order to weaken the vinyl at the seal line, or other means known in the art for creating an area of weakened material strength. The tear line 30 allows the individual holder 10 to be torn away from the spiral binding 24 in order to mount the holder 10 in a three-ring binder, or to use the holder 10 for any other purpose away from the display stand 22.

Although the preferred embodiment of the present invention utilizes vinyl to form the holder 10 and vinyl-covered cardboard to form the display stand 22, it will be appreciated by those having ordinary skill in the art hat other materials may be used to form these pieces, such as heavy-stock paper, for example.

Figure 3:
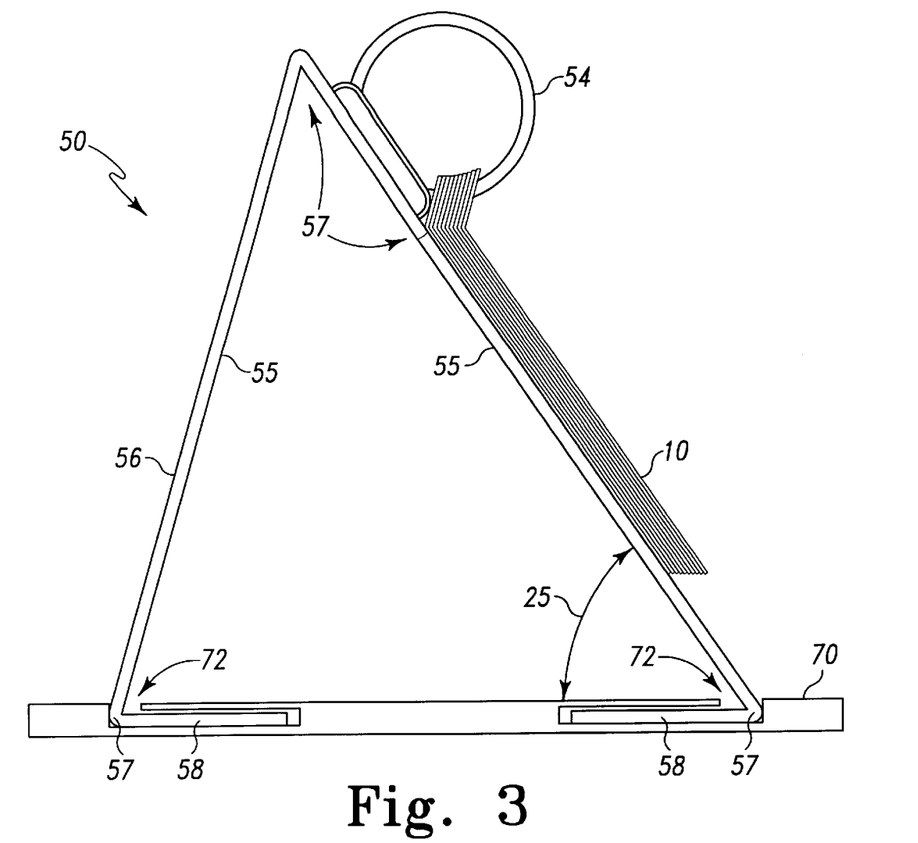
FIG. 3 is a side elevational view of a plurality of the holders of FIG. 1 bound into a second embodiment desktop display stand.

Referring now to FIG. 3, there is illustrated a second embodiment CD and booklet display stand, indicated generally at 50. The display stand 50 includes a plurality of single CD and booklet holders 10.

The plurality of holders 10 are preferably coupled to the display stand 50 by means of a pair of ¼" holes drilled near their top edges and engaged with a two ring, 1" capacity ring binder 54. The size of the ring binder 54 and the number of rings thereon may be varied without departing from the scope of the present invention. The ring binder 54 is attached to a binder cover 56 by any convenient means, such as by a pair of rivets therethrough. The binder cover 56 is preferably formed from a padded board (such as cardboard) covered with a 14 gauge vinyl, although other materials may be used in its construction. As with the first embodiment discussed hereinabove, other means may be used to attach the holders 10 to the display stand 50. The binder cover 56 preferably includes thin regions 57 that form preferential fold lines.

Figure 5:
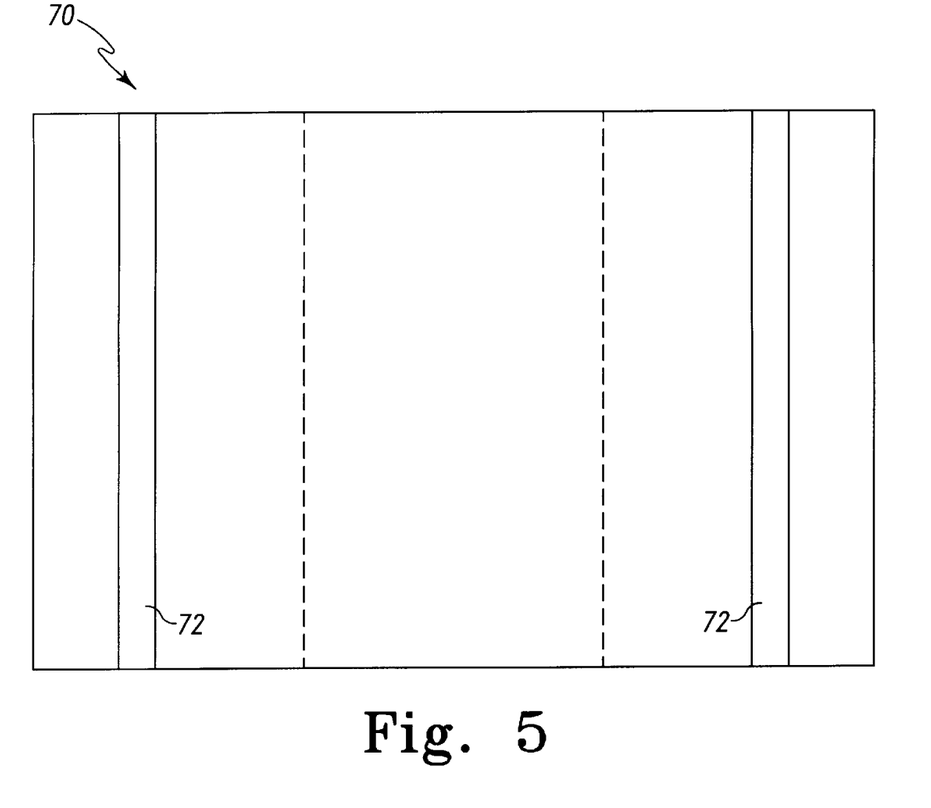
FIG. 5 is a top plan view of the base portion of the second embodiment desktop display stand of FIG. 3.
Figure 6:
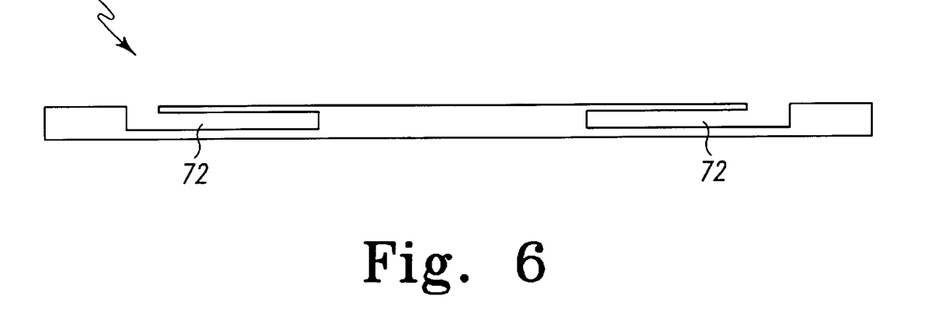
FIG. 6 is a side elevational view of the base portion of FIG. 5.

The binder cover 56 includes first and second top sections 55 and a pair of foldable end flaps 58 which form a bottom support surface for the binder cover 56 when it is engaged with the base 70 of the desktop display stand 50, as shown in FIG. 3. The base 70 is preferably formed from a rigid material, such as 75 gauge polyvinylchloride; however, the base 70 may be formed from any suitable material, such as injection-molded plastic, etc. As shown most clearly in FIGS. 5 and 6, the base 70 includes a pair of undercut slots 72 preferably formed entirely across a width thereof, allowing access to the slots 72 from either side of the base 70. As shown in FIG. 3, the slots 72 allow the end flaps 58 to be engaged therein, thereby maintaining the binder cover 56 in an upright position for convenient presentation of the holders 10 upon a desktop.

Figure 4:
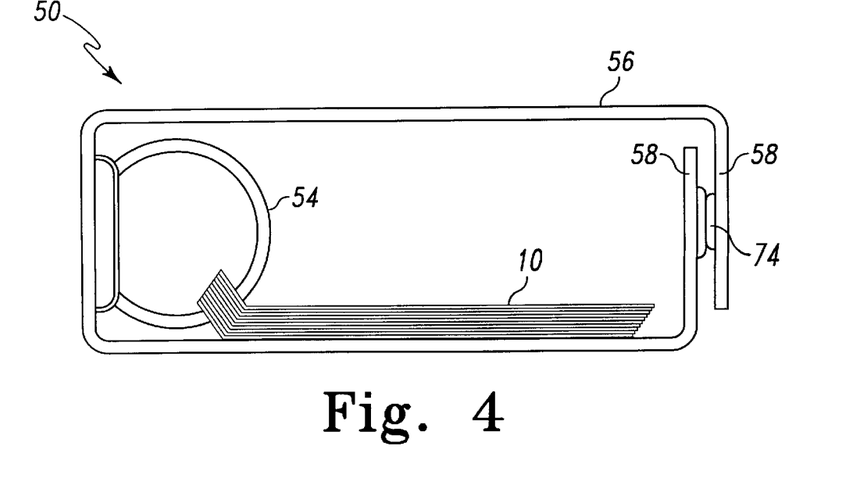
FIG. 4 is a side elevational view of a binder portion of the desktop display stand of FIG. 3, wherein the binder portion is removed from the display stand and folded for portability.

The display stand 50 allows the individual holders 10 to be rotated around the ring binder 54 and placed at the backside of the binder cover 56. In this way, the user may flip through the holders 10 until the desired holder 10 has been located, moving all of the holders 10 that are on top of the desired holder 10 to the rear of the display stand 50. This places the desired holder 10 on the front of the display stand, and the CD and the information booklet are then within easy reach. Furthermore, the binder portion of the display stand 10 may be completely removed from the base 70 by sliding it sideways until it completely separates from the slots 72. The binder cover 56 may then be folded as shown in FIG. 4 for secure transportation of the holders 10 and their contents. A closure 74 may be formed on the flaps 58, such as a hook-and-loop closure, snaps, etc., in order to securely close the binder cover 56 while in transit.

Figure 7:
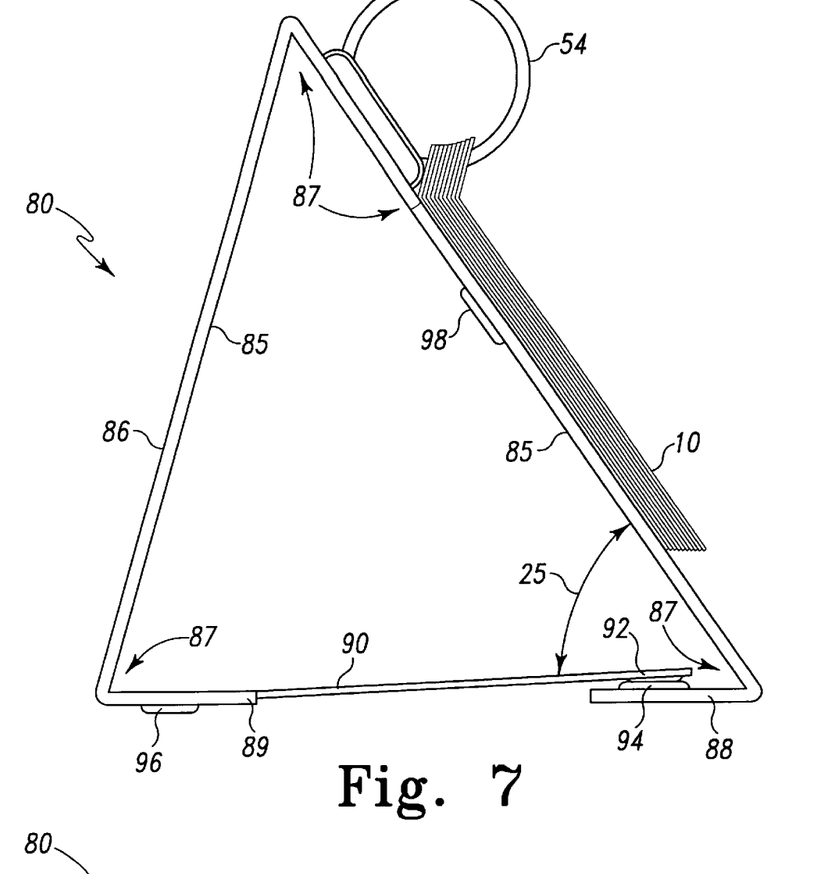
FIG. 7 is a side elevational view of a plurality of the holders of FIG. 1 bound into a third embodiment desktop display stand.
Figure 8:
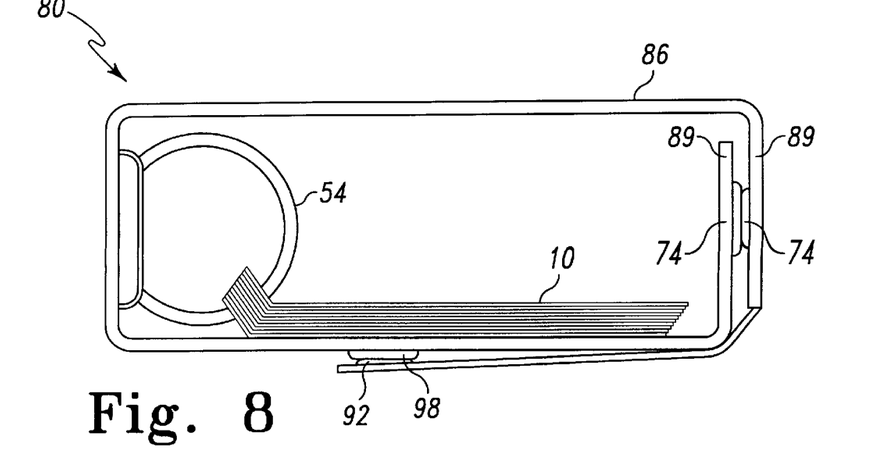
FIG. 8 is a side elevational view of the desktop display stand of FIG. 7 folded for portability.
Figure 9:
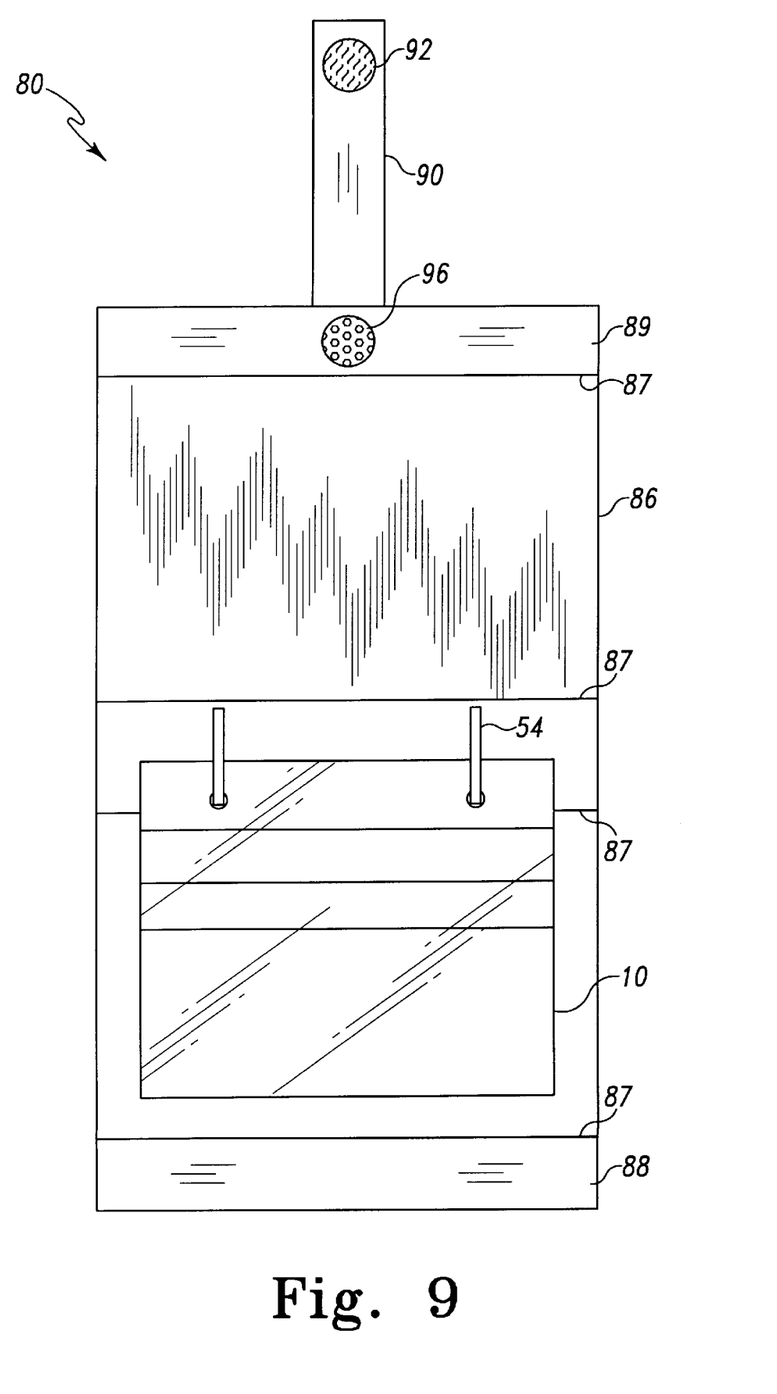
FIG. 9 is a top plan view of the desktop display stand of FIG. 7 laid flat.

Referring now to FIGS. 7–9, there is illustrated a preferred third embodiment CD and booklet display stand, indicated generally at 80. The display stand 80 includes a plurality of single CD and booklet holders 10. The plurality of holders 10 are preferably coupled to the display stand 80 by means of a pair of ¼" holes drilled near their top edges and engaged with a two-ring, 1" capacity ring binder 54. The size of the ring binder 54 and the number of rings thereon may be varied without departing from the scope of the present invention. The ring binder 54 is attached to a binder cover 86 by any convenient means, such as by a pair of rivets therethrough. The binder cover 86 is preferably formed from a padded board (such as cardboard) covered with a 14 gauge vinyl, although other materials may be used in its construction. As with the preferred embodiment discussed hereinabove, other means may be used to attach the holders 10 to the display stand 50. The binder cover 86 preferably includes thin regions 87 that form preferential fold lines.

The binder cover 86 includes first and second top sections 85 and a pair of first and second foldable end flaps 88 and 89, which form a bottom support surface of the binder cover 86 when it is folded into its desktop display position as shown in FIG. 7. A thin flap of vinyl 90 extends from the second end flap 89. A piece of hook-and-loop closure material 92 is attached a distal end of the strap 90 and mates with a complementary piece of hook-and-loop closure material 94 attached to the first end flap 88. It can therefore be seen that the strap 90 couples the first end flap 88 to the second end flap 89 when the display stand 80 is in a desktop display position (as shown in FIG. 7), thereby preventing the display stand 80 from collapsing.

The display stand 80 further includes a third piece of hook-and-loop closure material 96 attached to the second end flap 89 and a fourth piece of hook-and-loop closure material 98 attached to the binder cover 56 below the position of the holders 10. When the display stand 80 is folded into a portable, transport position as shown in FIG. 8, the hook-and-loop closure material piece 92 mates with the hook-and-loop closure material piece 98, while the hook-and-loop closure material piece 94 mates with the hook-and-loop closure material piece 96.

The display stand 80 allows the individual holders 10 to be rotated around the ring binder 54 and placed at the backside of the binder cover 86. In this way, the user may flip through the holders 10 until the desired holder 10 has been located, moving all of the holders 10 that are on top of the desired holder 10 to the rear of the display stand 80. This places the desired holder 10 on the front of the display stand 80, and the CD and the information booklet are then within easy reach. Furthermore, the display stand 80 may be folded as shown in FIG. 8 for secure transportation of the holders 10 and their contents. It will be recognized by those having ordinary skill in the art that the hook-and-loop closure material pieces 92–98 may be replaced with any suitable closure device, such as snaps, magnetic closures, etc.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A compact disc and booklet display stand, comprising:
   a plurality of holders, each holder adapted to hold a compact disc and a documentation booklet;
   a display stand having a bottom surface and at least one side surface; and
   a binding for coupling said plurality of holders to said display stand at least one side surface;
   wherein each of the plurality of holders comprises:
      a backside piece;
      a compact disc pocket piece overlying said backside piece; and
      a booklet pocket piece overlying said compact disc pocket piece;
   wherein said backside piece, said compact disc pocket piece and said booklet pocket piece are coupled on three sides, thereby forming a compact disc pocket between said backside piece and said compact disc pocket piece, and forming a booklet pocket between said compact disc pocket piece and said booklet pocket piece;
   wherein said backside piece, said compact disc pocket piece and said booklet pocket piece are formed from vinyl and are heat sealed to one another on three sides.

2. The compact disc and booklet display stand of claim 1, wherein said display stand orients said plurality of holders in a substantially vertical orientation when said display stand bottom surface is positioned an a horizontal surface.

3. The compact disc and booklet display stand of claim 1, wherein said display stand comprises:
   a bottom section having a first edge and a second edge;
   a first top section having a third edge coupled to the second edge and having a fourth edge;
   a second top section having a fifth edge coupled to the fourth edge and having a sixth edge coupled to the first edge;
   wherein a cross-section of said display stand is triangular.

4. The compact disc and booklet display stand of claim 3, wherein said bottom section, said first top section and said second top section are formed from cardboard.

5. The compact disc and booklet display stand of claim 1, wherein said binding comprises a spiral binding.

6. The compact disc and booklet display stand of claim 1, wherein said binding comprises a two-ring binder.

7. A compact disc and booklet display stand, comprising:
   a plurality of holders, each holder adapted to hold a compact disc and a documentation booklet;
   a display stand having a bottom surface and at least one side surface; and
   a binding for coupling said plurality of holders to said display stand at least one side surface;
   wherein said display stand orients said plurality of holders in a substantially vertical orientation when said display stand bottom surface is positioned on a horizontal surface;
   wherein said display stand comprises:
      a base; and
      a binder cover releasably coupled to said base, wherein said binding is coupled to said binder cover.

8. The compact disc and booklet display stand of claim 7, wherein said base comprises:
   a base member; and
   two parallel undercut slots formed in said base member.

9. The compact disc and booklet display stand of claim 7, wherein said binder cover comprises:
   a first end flap having first and second edges;
   a first top section having a third edge coupled to the second edge and having a fourth edge;
   a second top section having a fifth edge coupled to the fourth edge and having a sixth edge;
   a second end flap having a seventh edge coupled to the sixth edge and having an eighth edge.

10. The compact disc and booklet display stand of claim 9, further comprising:
    a first closure coupled to said first end flap; and
    a second closure coupled to said second end flap;
    wherein said binder cover may be removed from said base and folded around said plurality of holders and said first closure may be engaged with said second closure.

11. The compact disc and booklet display stand of claim 10, wherein said first and second closures comprise hook-and-loop closures.

12. A compact disc and booklet display stand, comprising:
    a plurality of holders, each holder adapted to hold a compact disc and a documentation booklet;
    a display stand having a bottom surface and at least one side surface; and a binding for coupling said plurality of holders to said display stand at least one side surface;

wherein said display stand orients said plurality of holders in a substantially vertical orientation when said display stand bottom surface is positioned on a horizontal surface;

wherein said display stand comprises:
- a first end flap having first and second edges;
- a first top section having a third edge coupled to the second edge and having a fourth edge;
- a second top section having a fifth edge coupled to the fourth edge and having a sixth edge;
- a second end flap having a seventh edge coupled to the sixth edge and having an eighth edge;
- a strap having a ninth edge coupled to the eight edge and having a tenth edge;
- a first closure coupled to said first end flap; and
- a second closure coupled to said strap;

wherein said first closure may be releasably engaged with said second closure in order to maintain said plurality of holders in a substantially vertical position when said first and second end flaps are placed on a horizontal surface.

13. The compact disc and booklet display stand of claim 12, wherein said display stand further comprises:
- a third closure coupled to said second end flap; and
- a fourth closure coupled to said first top section;

wherein said display stand may be folded around said plurality of holders and said first closure may be engaged with said third closure and said second closure may be engaged with said fourth closure.

14. The compact disc and booklet display stand of claim 12, wherein said first and second closures comprise hook-and-loop closures.

15. The compact disc and booklet display stand of claim 13, wherein said, first, second, third and fourth closures comprise hook-and-loop closures.

16. A compact disc and booklet holder, comprising:
- a backside piece;
- a compact disc pocket piece overlying said backside piece; and
- a booklet pocket piece overlying said compact disc pocket piece;

wherein said backside piece, said compact disc pocket piece and said booklet pocket piece are coupled on three sides, thereby forming a compact disc pocket between said backside piece and said compact disc pocket piece, and forming a booklet pocket between said compact disc pocket piece and said booklet pocket piece;

wherein said backside piece comprises suede vinyl.

17. A compact disc and booklet holder, comprising:
- a backside piece;
- a compact disc pocket piece overlying said backside piece; and
- a booklet pocket piece overlying said compact disc pocket piece;

wherein said backside piece, said compact disc pocket piece and said booklet pocket piece are coupled on three sides, thereby forming a compact disc pocket between said backside piece and said compact disc pocket piece, and forming a booklet pocket between said compact disc pocket piece and said booklet pocket piece;

wherein said compact disc pocket piece and said booklet pocket piece comprise clear vinyl.

18. A compact disc and booklet holder, comprising:
- a backside piece;
- a compact disc pocket piece overlying said backside piece; and
- a booklet pocket piece overlying said compact disc pocket piece;

wherein said backside piece, said compact disc pocket piece and said booklet pocket piece are coupled on three sides, thereby forming a compact disc pocket between said backside piece and said compact disc pocket piece, and forming a booklet pocket between said compact disc pocket piece and said booklet pocket piece;

wherein said backside piece, said compact disc pocket piece and said booklet pocket piece are coupled on three sides by heat sealing.

* * * * *